United States Patent [19]

Anderson

[11] Patent Number: 4,497,177
[45] Date of Patent: * Feb. 5, 1985

[54] WIND GENERATING MEANS

[76] Inventor: Max F. Anderson, R.R. #1, Stewardson, Ill. 62463

[*] Notice: The portion of the term of this patent subsequent to Apr. 17, 2001 has been disclaimed.

[21] Appl. No.: 547,479

[22] Filed: Oct. 31, 1983

Related U.S. Application Data

[63] Continuation-in-part of Ser. No. 53,828, Jul. 2, 1979, Pat. No. 4,442,887.

[51] Int. Cl.³ .............................................. F03G 7/02
[52] U.S. Cl. ............................... 60/641.12; 60/641.11
[58] Field of Search ................. 60/641.1, 641.6, 641.8, 60/641.9, 641.11, 641.12, 675

[56] References Cited

U.S. PATENT DOCUMENTS

| | | | |
|---|---|---|---|
| 2,761,292 | 9/1956 | Coanda et al. | 62/140 |
| 3,317,406 | 5/1967 | Beard | 202/180 |
| 3,436,908 | 4/1969 | Van Delic | 60/641.12 |
| 3,894,393 | 7/1975 | Carlson | 60/641.11 |
| 4,070,131 | 1/1978 | Yen | 415/3 |
| 4,131,513 | 12/1978 | Green | 202/185 B |
| 4,197,162 | 4/1980 | Cardinal, Jr. | 202/234 |
| 4,391,099 | 7/1983 | Sorensen | 60/641.12 X |
| 4,442,887 | 4/1984 | Anderson | 165/85 |

Primary Examiner—Stephen F. Husar
Attorney, Agent, or Firm—Victor R. Beckman

[57] ABSTRACT

A system for obtaining air movement is disclosed which includes a basin of water covered by a solar energy-transmitting dome a spaced distance over the basin. The basin is located on a mountainside, adjacent a cliff, or the like. a surface type heat exchanger is located in the water adjacent the bottom of the basin, and an air inlet passage is provided having one end which terminates above the water surface beneath the dome and an opposite end connected to the heat exchanger. A long air outlet passage in the form of a flexible tube made of canvas, plastic sheet, or the like, is connected to the outlet from the heat exchanger, which outlet passage extends downwardly along the mountain slope, cliff, or the like. Venturi tubes are located along the air outlet passage, and vane-driven devices are positioned at the venturi tubes for operation by the cooled air flowing downwardly therethrough. An air valve at the bottom end of the air outlet passage controls the rate of air flow therethrough. The long air outlet passage is shielded from the sun to prevent solar heating of air flowing therethrough.

11 Claims, 5 Drawing Figures

WIND GENERATING MEANS

RELATED APPLICATION

This is a continuation-in-part application of copending U.S. patent application Ser. No. 53,828, filed July 2, 1979, now U.S. Pat. No. 4,442,887, entitled Apparatus and Method for Harnessing Wave Motion and Solar Energy and Coriolis Acceleration of Nature for Solar Distillation Use, and the Like.

BACKGROUND OF THE INVENTION

Distillation means including means for solar distillation of ocean water are well known as shown, for example in U.S. Pat. Nos. 2,761,292—Coanda et al; 3,317,406—Beard; 4,131,513—Green; 4,197,162—Cardinal, and numerous other patents. Windturbines are, of course, well known as shown, for example, in U.S. Pat. No. 4,070,131—Yen. Also, solar air moving systems for obtaining upward movement of air through an elongated conduit are known as shown, for example, in U.S. Pat. No. 3,436,908—Van Delic. Although solar stills, windmills and like wind-driven devices are well known, no prior art arrangements for generating cyclonic air movement using Coriolis acceleration, and directing said air downwardly through an elongated conduit within which one or more wind-driven devices are located are known to applicant.

SUMMARY OF THE INVENTION AND OBJECTS

An object of this invention is the provision of improved method and means of producing by natural energy forces a cyclonic wind of great magnitude for driving wind-propelled means such as propeller-generators, and the like.

An object of this invention is the provision of method and means of the above-described type which also functions for solar distillation of water.

The above and other objects and advantages of this invention are achieved by use of a basin for water, or pond, located on a hill, mountainside, cliff, or the like. The system is advantageously located in a hot, dry, climate near a water source for filling the basin. A cover is provided over the basin through which solar energy is transmitted for heating, and evaporating, water contained in the basin. A heat exchanger, or vapor condenser, is located in the basin adjacent the bottom thereof to which water vapor-laden air from above the water surface of the basin is supplied through a vertically extending air inlet conduit, or passageway. A condenser discharge conduit, or passageway, extends from the vapor condenser to a location outside the covered basin, to which condenser discharge conduit a long air-conducting conduit is attached which extends down the side of the mountain, cliff, or the like, upon which the basin is located. At the vapor condensing means, heat is extracted from the water vapor, reducing the same to water, and the water and cooled air are discharged from the condenser discharge conduit of the vapor condenser. Cooled air from the condensing discharge conduit flows downwardly through the long air-conducting conduit and is discharged from the lower end thereof. The air-conducting conduit is shielded from the sun to minimize solar heating of cooled air as it flows downwardly therethrough. Air inlet means are provided at the base of the cover for the admission of outside air to a location beneath the cover above the surface of water in the basin. Due to Coriolis acceleration, air under the dome travels in a circular motion about the air inlet conduit connected to the vapor condensing means. A plurality of wind-operated means are located under the cover, and in the long downwardly extending air conducting tube leading from the vapor condensing means, for operation by the passing air. The long downwardly extending tube may be formed of a flexible cloth, canvas, plastic or like material, since the pressure of air passing downwardly therethrough maintains the tube in an inflated condition. An air damper plate, or valve, may be located in the long downwardly extending tube for air control through the system.

The invention, together with the above and other objects and advantages thereof will be better understood from the following description when considered with the accompanying drawings.

BRIEF DESCRIPTION OF THE DRAWINGS

In the drawings, wherein like reference characters refer to the same parts in the several views.

Figure 1:
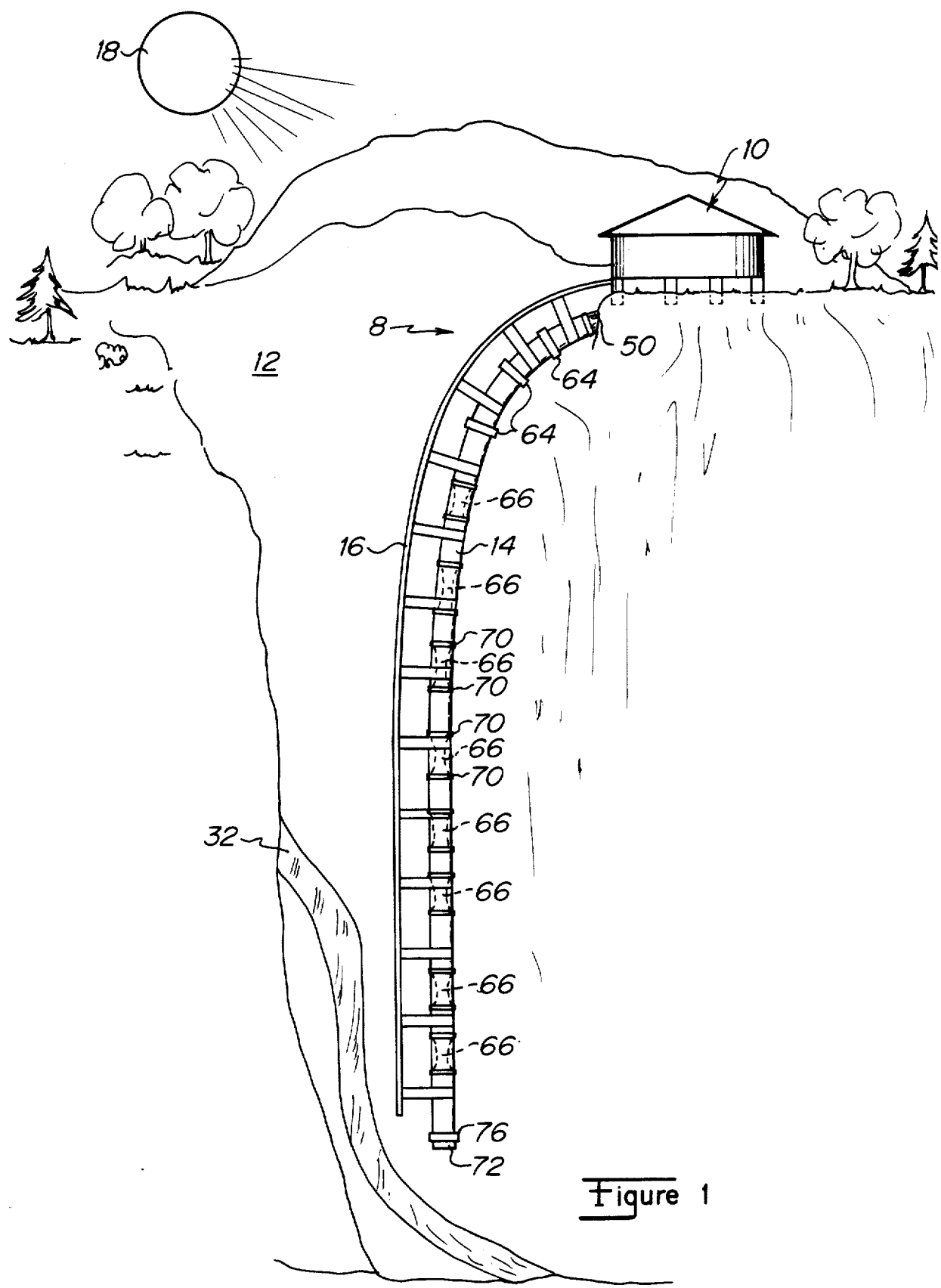
FIG. 1 is a schematic view of the novel solar still and wind generating system located adjacent a deep canyon.

Referring first to FIG. 1, the novel system 8 of this invention is shown comprising wind-generating means 10 located adjacent the upper edge of a gorge, or canyon, 12, together with a long air duct, or tube, 14 extending from the wind-generator 10 down the canyon wall. Depending upon the location and orientation of the tube 14 relative to the path of the sun, a sun shield 16 may be positioned over the tube to intercept rays from the sun 18 and prevent solar heating of the tube and of air flowing downwardly therethrough. If desired, the tube 14 may be made of flexible material such as canvas, plastic film or sheet, or the like. As described in greater detail hereinbelow, the tube 14 contains one or more wind-operated devices which are propelled by the air flowing downwardly through the tube.

Figure 2:
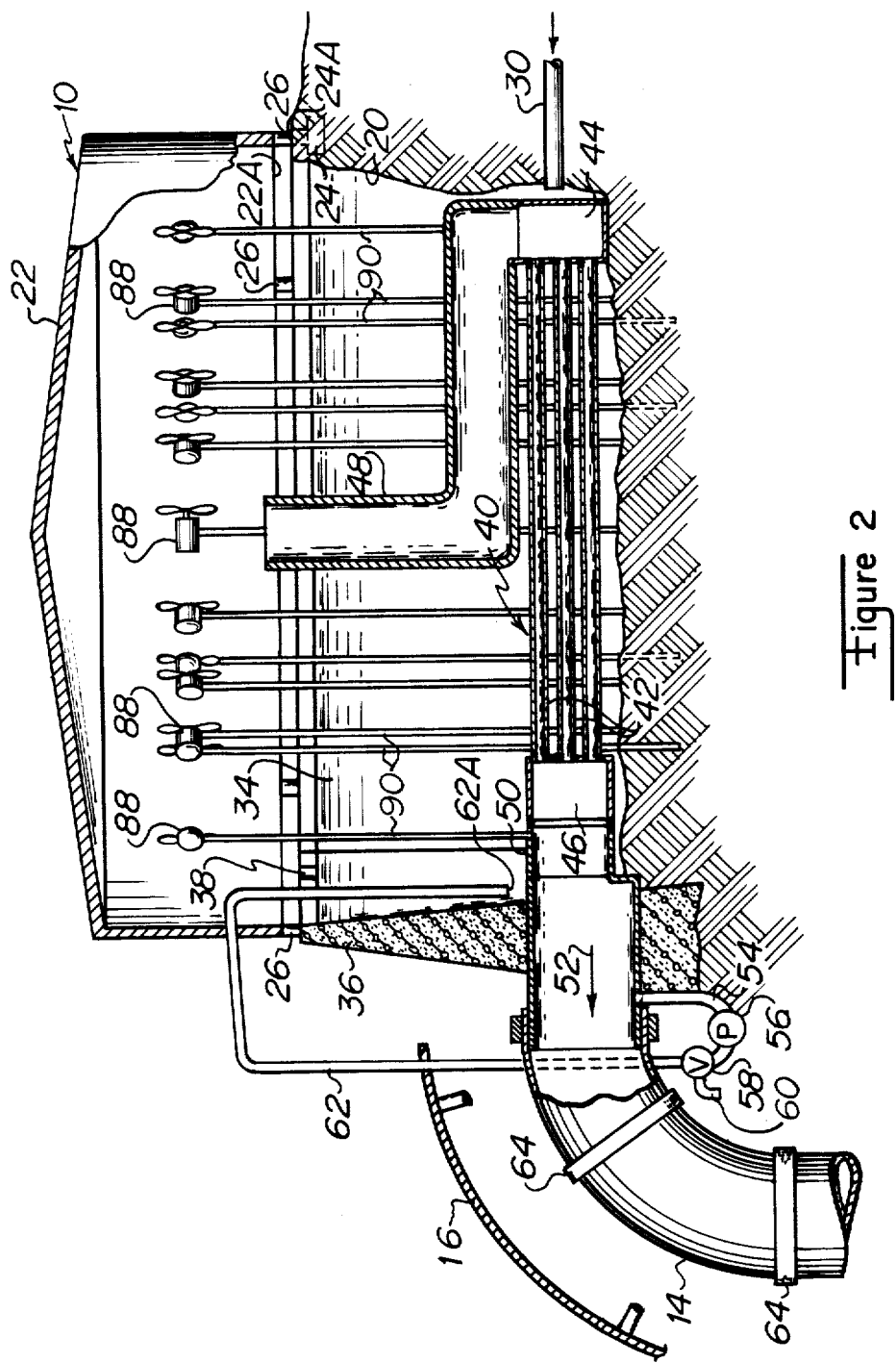
FIG. 2 shows in diagrammatic form a fragmentary side elevational view with parts broken away for clarity of details of a novel solar still and wind generating means embodying the present invention.
Figure 3:
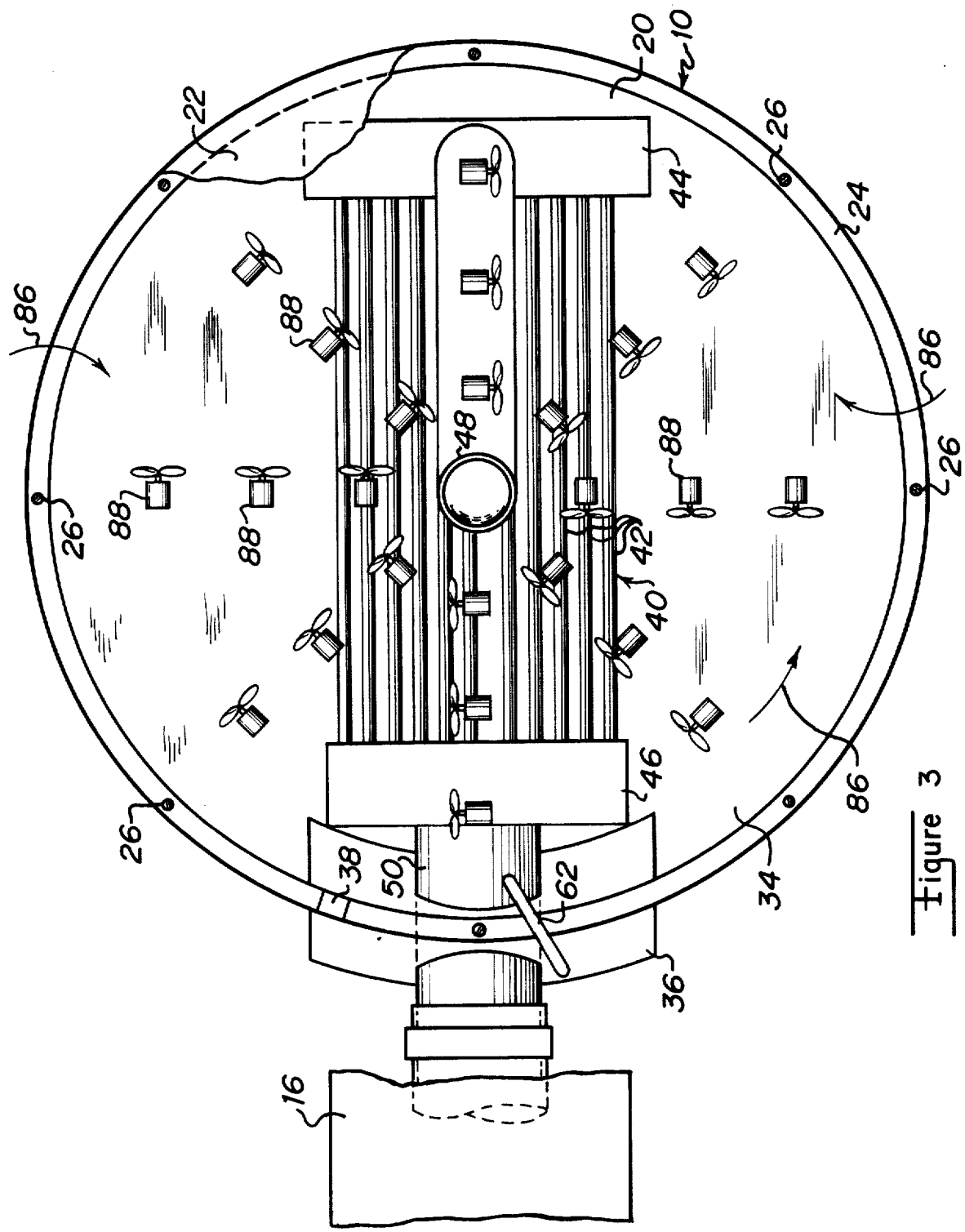
FIG. 3 is a diagrammatic plan view of the system shown in FIG. 2 with a portion of the solar cover shown broken away for clarity.

The cyclonic wind generating unit 10 may be of substantially the same design as that shown in the above-mentioned copending U.S. patent application Ser. No. 53,828, now U.S. Pat. No. 4,442,887. Referring to FIGS. 2 and 3, the cyclonic wind generating unit 10 is shown to include a basin, or pond, 20 which preferably is of a generally circular shape and is covered by a solar energy-transmitting dome, or cover, 22. The basin simply may comprise a natural or excavated depression, such as illustrated, if the soil conditions are favorable. In the illustrated arrangement, a foundation wall 24 is provided at the periphery of the pond for support of posts 26 upon which the dome 22 is supported. At least a portion of the lower edge 22A of the dome 22 is spaced from the upper face 24A of the foundation 24 to provide for the passage of outside air under the dome. Obviously, the basin may comprise a fully lined structure, if desired.

Water may be pumped into the basin through an inlet pipe 30 from any suitable water supply source, such as a river 32 flowing through the gorge. (See FIG. 1.) The basin is filled with water 34, with any excess water pumped into the basin being drained therefrom by use of an overflow drain, spillway, or the like. The illustrated basin includes a dam, or barrier, 36 formed with a spillway 38 over which excess water may flow. If the system is also employed for the distillation of salt water, brine may be conducted from the spillway into evaporation ponds, for example, for evaporation of water and recovery of salt therefrom.

Surface type vapor condensing, or heat exchange, means 40 are located in the water 34 adjacent the bottom of the basin 20 for cooling warm humid air passed therethrough and condensing water vapor contained therein. Any suitable heat exchange means may be used and, for purposes of illustration only, and not by way of limitation, the condenser 40 is shown comprising a plurality of air tubes 42 extending between air inlet and outlet manifolds 44 and 46, respectively. An air inlet conduit, or passage, 48, and air outlet conduit, or passage 50, communicate with the respective inlet and outlet manifolds 44 and 46.

The air inlet passage 48 provides communication between the heat exchanger 40 and the solar-heated air beneath the dome 22 above the level of water 34 contained in the basin. The air outlet passage 50 provides communication between the heat exchanger 40 and the discharge tube 14 which extends down the side of the gorge and which as noted above, terminates at a location outside the dome 22. In the illustrated arrangement, the outlet passage 50 extends through the dam 36. The condenser tubes 42, outlet manifold 46 and discharge tube 50 are inclined downwardly toward the dam 36 for the downward flow of cooled air and condensed water vapor contained therein.

In addition to being located at a long downslope near a water source, the system is of particular use at such locations where the climate is hot and dry. The surface of water 34 in the basin 20 is heated by solar energy transmitted through the dome 22 for evaporation of the water from the basin. As water evaporates, heat is extracted from water in the basin to cool the same. Cold, dense, water flows to the bottom of the basin, providing for a temperature gradient within the water such that water adjacent the surface where evaporation takes place is warmer than water at the bottom of the basin surrounding the surface condenser 40. Warm humid air enters the condenser 40 through the inlet passage 48 and manifold 44, where it is cooled. Air within the condenser is cooled to a lower temperature than ambient temperature, at least during warm daylight periods. Cooled air within the condenser 40, being heavier than air at the bottom open end of the discharge tube 14, therefore flows downwardly through the tube 14, in the direction of arrow 52, to exit from the system at the bottom of tube 14. As noted above, an awning, or sunshade 16, may be located over the discharge tube 14 to prevent solar heating of the air flowing therethrough. Also as noted above, ambient air is drawn into the system beneath the lower edge 22A of the dome 22.

Condensed water vapor also flows from the condenser tubes 42 into the outlet manifold 46 and thence to outlet tube 50. A drain tube 54 is provided in the bottom of the outlet tube 50 through which distilled water may drain. A pump 56 and valve 58 are included in the drain tube 54. The valve 58 is movable between a first position for discharge of water through a spout 60, and a second position for pumping water back into the basin 20 through a tube 62. The discharge end 62A of tube 62 is located adjacent the bottom of the basin to provide added cooling for the condenser 40. Additionally, water normally supplied to the basin through water inlet pipe 30 also is at a lower temperature than ambient air temperature during daylight hours to facilitate further cooling of air passing through the condenser 40.

As noted above, cooled air from the heat exchanger 40 flows downwardly through the long sloping tube 14 and is discharged from the lower end thereof. If desired, the tube 14 may comprise a pipe formed of solid material such as plastic, metal or the like. Preferably, the tube 14 is made of flexible material such as flexible plastic sheet, cloth, canvas, or the like. Solid annular members or rings, 64 may be included along the tube 14, to which rings the tube is attached to help maintain the tube in a generally cylindrical shape. As noted above, air flowing downwardly through the tube normally retains the tube in an inflated condition.

Figure 4:
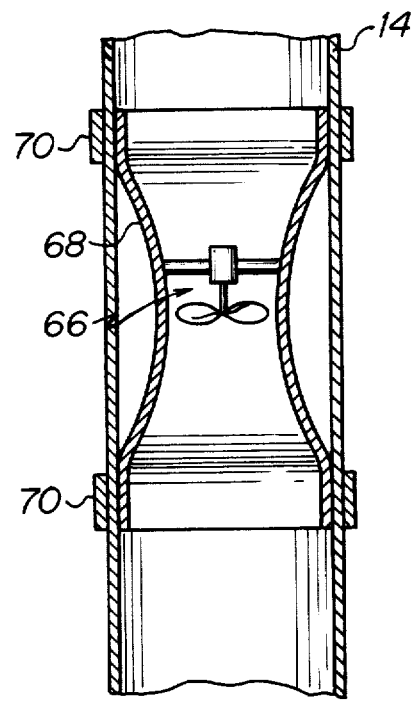
FIG. 4 is an enlarged fragmentary longitudinal sectional view through the air discharge tube showing a wind-driven device mounted therein.

Wind-driven means 66, such as vane-driven generators are located at suitable intervals along the tube 14 to harness the flowing air. A suitable mounting for the vane-driven generators is shown in FIG. 4, to which figure reference now is made. There, a venturi tube 68 is shown inside the tube 14. Rings 70 at the entrance and exit of the venturi tube 68 clamp the same in position inside the discharge tube 14. The vane-driven generator 66 is mounted inside the venturi tube 68 with the vane thereof at the throat of the venturi tube. The increased velocity of air through the throat of the venturi tube provides for an increased speed of rotation of the generator vane positioned threat. A plurality of such venturi tubes and associated vane driven generators may be included along the length of the discharge tube 14, as shown by the clamping rings 70 in FIG. 1.

Figure 5:
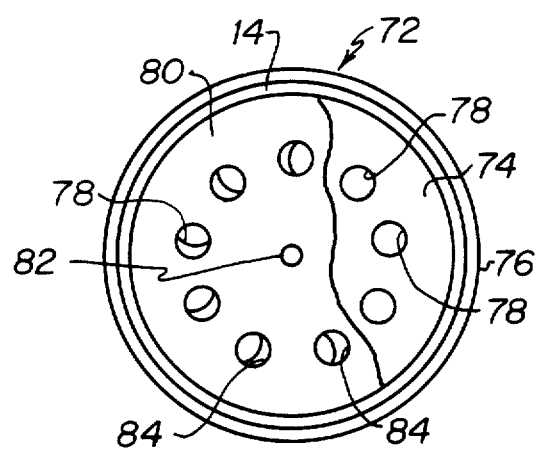
FIG. 5 is an enlarged view of the bottom end of the air discharge tube showing valve means for control of air flow through the tube.

The lower discharge end of the downwardly sloping tube 14 is provided with a damper, or valve, 72 for control of air flow through the system. Reference is made to FIG. 5 wherein a diagrammatic end view of the valve 72 is shown, which valve comprises a plate 74 affixed by clamping ring 76 to the tube 14. The plate is formed with a ring of apertures 78 through which air is discharged from the tube 14. A movable plate 80 is rotatably attached to the fixed plate 74 for rotation about a central pivot pin 82. The movable plate 80 is provided with a similar circular array of holes 84 as holes 78 formed in plate 74. Varying portions of the apertures 78 are cut-off by the movable plate 80 depending upon the relative rotary position of the plates, for control of air through the system. Obviously, other valve means including valve means positioned at other locations within the system may be employed. Also, high speed turbine generators may be located at the individual apertures of the valve 72 for operation by the air flowing therethrough.

As shown in FIGS. 2 and 3, the inlet end of air passage 48 is of cylindrical shape and preferably is located adjacent the center of the dome 22 to facilitate rotational motion or air under the dome. As is well understood, due to Coriolis acceleration, air traveling toward the equator is deflected westward, and air traveling away from the equator is deflected eastward. Consequently, in the Northern hemisphere, the air will rotate in a counterclockwise direction, and in the Southern hemisphere it will rotate clockwise in passing through the vertical inlet tube 48. In FIG. 3, a Northern hemisphere location is indicated by air rotation counterclockwise in the direction of arrows 86. A cyclonic wind is therefore produced within the dome 22, with a vortex extending along the dome 22 and air inlet passage 48 axes. The rotating mass of air, as the rotor of a gyroscope, is subject to gyroscopic inertia, precession, and the like.

Energy of the resultant whirling, or cyclonic, wind is readily harnessed as by locating wind-operated means in the path thereof. Any suitable wind-driven means may be employed and, for purposes of illustration, an array of vane-driven generators 88 are shown mounted atop poles 90 extending from the basin 20 and condenser inlet and outlet tubes. They are oriented such that the vanes face in the direction of the cyclonic wind for maximum coupling therewith. Also, they may be fixed in position without the need to swivel or feather, or tip out of operable position as in the case of a storm. Electrical power generated by the generators may be used for any desired purposes, not shown. Due to the cyclonic motion of the mass of air inside the dome, high velocity winds are produced which are capable of generating large amounts of useful energy when properly harnessed. The winds within the dome also serve to generate ripples, or waves, on the surface of the water 34 in the basin to further promote evaporation thereof.

It will be apparent that the drawings are not to scale but, primarily, comprise diagrammatic showings which are intended to illustrate the invention. A wide range of sizes is possible in the employment of the invention, including extremely large sizes. For example, the basin 20 and dome 22 covering the same may cover a surface area on the order of fifty acres to one square mile. The basin may have a depth of, say, 40 feet, and from 200 to 2500 wind-driven generators may be included under the dome. An air discharge tube 14 with a diameter on the order of 100 feet and length of at least 1,000 feet and preferably over 5,000 feet is employed, depending upon the size of the dome and site of the wind generating means 10. If desired, a plurality of air inlet tubes for the condenser 40 may be included at different locations beneath the dome to impede cyclonic wind action under the dome. Also, the long discharge tube 14 may be located in a trench or tunnel along the side of a slope to further shield the tube from solar radiation to prevent heating thereof. Additionally, the tube 14 may be insulated. If available, a source of cold water, such as cold ocean water, may be supplied to the basin through water supply pipe 30 to provide for additional cooling for the heat exchanger 40. In any event, sufficient water is added to the basin to make up for water lost by evaporation and the like.

The invention having been described in detail in accordance with requirements of the Patent Statutes, various other changes and modifications will suggest themselves to those skilled in this art, which changes and modifications are intended to fall within the spirit and scope of the invention as defined in the appended claims.

I claim:

1. In a system for obtaining air movement, the combination comprising,
   a basin of water,
   a solar energy-transmitting cover over said basin for heating water contained therein,
   air inlet means for providing air from a location outside said system to a location beneath said cover above the surface of water in the basin,
   surface type heat exchange means adjacent the bottom of said basin for cooling air passing therethrough by cooling water adjacent the bottom of said basin,
   vertically extending air inlet passage means having an upper end terminating above the surface of the water beneath said cover in a source of air to be cooled and a lower end connected to said heat exchange means for supplying air thereto, said air inlet passage means providing communication between said heat exchange means and air source beneath said cover above the surface of the water in the basin,
   an elongated air outlet passage means extending downwardly from the heat exchange means for unpumped gravity flow of cooled air downwardly from said heat exchange means through said elongated air outlet passage means, and
   vane-driven means inside said elongated air outlet passage means for operation by downwardly flowing air therethrough.

2. In a system as defined in claim 1 wherein said elongated air outlet passage means comprises a tube made of flexible material such as plastic sheet, canvas, or the like.

3. In a system as defined in claim 1 including a venturi tube inside said air outlet passage means at the throat of which venturi tube said vane driven means is located.

4. In a system as defined in claim 1 including means for shielding said elongated air outlet passage means from direct radiation from the sun to reduce solar heating of air flowing through said elongated air outlet passage means.

5. In a system as defined in claim 1 including air valve means in said elongated air outlet passage means for use in controlling the velocity of air flowing through said system.

6. In a system as defined in claim 5 wherein said air valve means are located adjacent the lower discharge end of said elongated air outlet passage means.

7. In a system as defined in claim 1 including a plurality of vane-driven means under the cover above the surface of water in the basin for operation by air flowing beneath the cover.

8. In a system as defined in claim 1 including a source of water for supplying water to said basin to maintain water in the basin.

9. In a system as defined in claim 1 including means for pumping water formed by condensation of water vapor in said heat exchange means into said basin adjacent said heat exchange means.

10. In a wind generating system the combination comprising,
    a basin of water,
    a dome of solar energy transmitting material covering said basin,
    air inlet means for providing air from a location outside said system to a location beneath the dome above the surface of water in the basin,
    heat exchange means beneath the dome in the basin adjacent the bottom of the basin,
    vertically extending air inlet passage means beneath the dome in axial alignment with the dome axis, said air inlet passage having an upper end terminating beneath the dome above water in the basin and a lower end in communication with said heat exchange means for supply of air thereto, air entering said air inlet passage means from beneath the dome with a cyclonic motion due to Coriolis acceleration thereof, elongated air outlet means for the heat exchange means extending downwardly along a mountain slope, cliff, or the like, and vane-driven means located under the dome and inside the elongated air outlet means for operation by cyclonic air flow under the dome and by downward air flow through said elongated air outlet means, respectively.

11. In a wind generating system as defined in claim 10 including means for shielding said air outlet means from radiation from the sun to minimize solar heating of air flowing downwardly therethrough.

* * * * *